(12) United States Patent
Pedersen

(10) Patent No.: US 10,320,554 B1
(45) Date of Patent: Jun. 11, 2019

(54) DIFFERENTIAL POWER ANALYSIS RESISTANT ENCRYPTION AND DECRYPTION FUNCTIONS

(71) Applicant: Altera Corporation, San Jose, CA (US)

(72) Inventor: Bruce B. Pedersen, Sunnyvale, CA (US)

(73) Assignee: Altera Corporation, San Jose, CA (US)

(*) Notice: Subject to any disclaimer, the term of this patent is extended or adjusted under 35 U.S.C. 154(b) by 173 days.

(21) Appl. No.: 15/139,071

(22) Filed: Apr. 26, 2016

Related U.S. Application Data

(62) Division of application No. 13/098,315, filed on Apr. 29, 2011, now Pat. No. 9,331,848.

(51) Int. Cl.
*H04K 1/04* (2006.01)
*H04L 9/00* (2006.01)
*H04L 9/06* (2006.01)

(52) U.S. Cl.
CPC ............ *H04L 9/003* (2013.01); *H04L 9/0631* (2013.01); *H04L 2209/16* (2013.01); *H04L 2209/24* (2013.01)

(58) Field of Classification Search
CPC .... H04L 2209/16; H04L 9/0631; H04L 9/003
USPC .......................................................... 380/37
See application file for complete search history.

(56) References Cited

U.S. PATENT DOCUMENTS

| | | | |
|---|---|---|---|
| 6,249,582 B1 | 6/2001 | Gilley | |
| 8,127,130 B2 | 2/2012 | Ellis | |
| 8,332,652 B2 | 12/2012 | Boivie et al. | |
| 2003/0002677 A1 | 1/2003 | Dagan et al. | |
| 2003/0223580 A1* | 12/2003 | Snell | H04L 9/003 380/28 |
| 2004/0039908 A1 | 2/2004 | Rose et al. | |
| 2004/0107341 A1 | 6/2004 | Hall et al. | |
| 2004/0131182 A1 | 7/2004 | Rogaway | |

(Continued)

OTHER PUBLICATIONS

Park et al, Low Power Compact Design of ARIA Block Cipher, May 24, 2006, IEEE, pp. 313-316.*

(Continued)

*Primary Examiner* — Christopher J Browm
*Assistant Examiner* — Jenise E Jackson
(74) *Attorney, Agent, or Firm* — Fletcher Yoder, P.C.

(57) ABSTRACT

Circuits, methods, and systems are provided for securing an integrated circuit device against Differential Power Analysis (DPA) attacks. Plaintext (e.g., configuration data for a programmable device) may be encrypted in an encryption system using a cryptographic algorithm. Ciphertext may be decrypted in a decryption system using the cryptographic algorithm. The encryption and/or decryption systems may obfuscate the plaintext, the ciphertext, and/or the substitution tables used by the cryptographic algorithm. The encryption and/or decryption systems may also generate cryptographic key schedules by using different keys for encrypting/decrypting different blocks and/or by expanding round keys between encryption/decryption blocks. These techniques may help mitigate or altogether eliminate the vulnerability of cryptographic elements revealing power consumption information to learn the value of secret information, e.g., through DPA.

14 Claims, 15 Drawing Sheets

(56) References Cited

U.S. PATENT DOCUMENTS

| | | | |
|---|---|---|---|
| 2005/0213756 A1 | 9/2005 | Hubert | |
| 2006/0023875 A1* | 2/2006 | Graunke | H04L 9/065 |
| | | | 380/28 |
| 2006/0050887 A1 | 3/2006 | Chen | |
| 2007/0237327 A1 | 11/2007 | Taylor et al. | |
| 2007/0255941 A1* | 11/2007 | Ellis | H04L 9/0662 |
| | | | 713/151 |
| 2007/0286418 A1 | 12/2007 | Hall et al. | |
| 2008/0130891 A1 | 6/2008 | Sun et al. | |
| 2008/0148063 A1* | 6/2008 | Hanko | G06F 21/10 |
| | | | 713/189 |
| 2008/0285745 A1* | 11/2008 | Teglia | H04L 9/003 |
| | | | 380/29 |
| 2009/0222667 A1 | 9/2009 | Vauclair et al. | |
| 2010/0115286 A1* | 5/2010 | Hawkes | G06F 12/1408 |
| | | | 713/189 |
| 2010/0299538 A1* | 11/2010 | Miller | G06F 12/1408 |
| | | | 713/190 |
| 2011/0096923 A1* | 4/2011 | Rollgen | H04L 9/0625 |
| | | | 380/28 |
| 2011/0231464 A1* | 9/2011 | Rivoir | G06F 7/584 |
| | | | 708/232 |
| 2011/0261958 A1* | 10/2011 | Gebotys | H04L 9/003 |
| | | | 380/252 |
| 2013/0287205 A1 | 10/2013 | Leech | |
| 2015/0172045 A1 | 6/2015 | Leidich et al. | |

OTHER PUBLICATIONS

Peng et al, A Novel Feedback Block Cipher Based on the Chaotic Time-Delay Neuron System and Feistel Network, Jun. 28, 2006, IEEE, pp. 1618-1622.*

Runje et al, Universal Strong Encryption FPGA Core Implementation, Feb. 26, 1998, IEEE, pp. 923-924.*

Libert et al, Towards Practical Black-Box Accountable Authority I BE: Weak Black-Box Traceability with Short Ciphertexts and Private keys, Oct. 2011, IEEE, vol. 57 No. 10, pp. 7189-7204.

Baier et al, A Concept for Monitoring Self-Transforming Code Using Memory Page Access Control Management, 2011, IEEE, pp. 1-7.

* cited by examiner

DIFFERENTIAL POWER ANALYSIS RESISTANT ENCRYPTION AND DECRYPTION FUNCTIONS

CROSS-REFERENCE TO RELATED APPLICATIONS

This application is a divisional of Ser. No. 13/098,315, filed Apr. 29, 2011, entitled "Differential Power Analysis Resistant Encryption and Decryption" in the name of Bruce B. Pedersen.

FIELD OF THE INVENTION

This invention relates to methods and systems for securing the programming data of a programmable device—e.g., a field-programmable gate array (FPGA) or other programmable logic device (PLD)—against power analysis attacks, and to a programmable device so secured.

BACKGROUND OF THE INVENTION

Programmable devices are well known. In one class of known PLDs, each device has a large number of logic gates, and a user programs the device to assume a particular configuration of those logic gates, typically by receiving configuration data from a configuration device. Configuration data has become increasingly complex in modern PLDs. As such, proprietary configuration data for various commonly-used functions (frequently referred to as "intellectual property cores") have been sold either by device manufacturers or third parties, freeing the original customer from having to program those functions on its own. If a party provides such proprietary configuration data, it may want to protect this data from being read, as well as any internal data that may reveal the configuration data.

Commonly-assigned U.S. Pat. Nos. 5,768,372, and 5,915,017, each of which is hereby incorporated by reference herein in its respective entirety, describe the encryption of the configuration data and its decryption upon loading into the programmable device, including provision of an indicator to signal to the decryption circuit which of several possible encryption/decryption schemes was used to encrypt the configuration data and therefore should be used to decrypt the configuration data. Commonly-assigned U.S. Pat. No. 7,479,798, which is hereby incorporated by reference herein in its entirety, describes a disabling element that can be used to selectively disable a reading of a data from a device.

Cryptographic algorithms may provide one or more classes of encryption/decryption schemes for securing the configuration data. However, these cryptographic algorithms may be vulnerable to specific kinds of attacks. One type of attack on an encryption/decryption cryptographic system in a device is known as a power analysis attack. This approach involves observing the power consumption of the device while it is executing a cryptographic algorithm. An attacker can combine the data derived from observing the power consumption of the device with the knowledge of the specific operations that are executed during the cryptographic algorithm, and thereby deduce information about keys and other secret data of the cryptographic algorithm.

One type of power analysis attack is known as a Differential Power Analysis ("DPA") (see, for example, "Introduction to Differential Power Analysis and Related Attacks", by Paul Kocher et al., of Cryptography Research, San Francisco, Calif., copyright 1998, reprinted at web site: www.cryptography.com). DPA involves observing the power consumption of a device while it executes cryptographic operations for a large number of varying inputs. By collecting and statistically correlating data from these multiple observations, an attacker can derive secret information for the cryptographic operations carried out by the device.

Different elements of a cryptographic algorithm may be particularly vulnerable to DPA attacks. For example, key scheduling routines, used for generating multiple sub-keys for multiple cryptographic rounds from a secret cipher key may be especially vulnerable in this regard, given that these routines manipulate the cipher key in a known way. In addition, substitution tables (also referred to as substitution boxes or "S-boxes"), which are common in cryptographic algorithms and often implemented as look up tables, may also be vulnerable to DPA attacks. Also, the initial round of encryption or final round of decryption of some cryptographic algorithms may be particularly vulnerable to DPA attacks, because they may only involve key manipulation without modification of plaintext or ciphertext.

SUMMARY OF THE INVENTION

The present invention relates to systems and methods for protecting a programmable device against Differential Power Analysis attacks.

Therefore, in accordance with embodiments of the present invention, an encryption or decryption system may generate cryptographic key schedules by using different cipher keys for each block. In some implementations, a first cipher key may be derived as a function of a second cipher key and of one of a previous block of plaintext, a previous block of ciphertext, or an output of a linear feedback shift register (LFSR) associated with the previous block of plaintext. In some implementations, the encryption or decryption system may expand (i.e., evolve) round keys between encryption and/or decryption blocks. A key expansion block may generate from a cipher key a first sequence of round keys for decrypting a first block of ciphertext such that each round key is generated based on at least one preceding round key in the first sequence. The key expansion block may generate from at least one of the round keys of the first sequence a second sequence of round keys for decrypting a second block of ciphertext. In some implementations, the initial round key for decrypting a second block of plaintext is set to the final round key used for decrypting a first block of ciphertext. The sequence of decryption round keys may be inverted to generate a sequence of encryption round keys.

In some embodiments, the encryption or decryption cryptographic system that implements the cryptographic algorithm, e.g., on a programmable device, is configurable to use obfuscated substitution S-boxes. S-boxes may be obfuscated by interleaving data to be encrypted (or decrypted) with random data. In some implementations, the random data may be true random (e.g., generated by a True Random Number Generator). In some implementations, the random data may be pseudo-random (e.g., generated by a linear feedback shift register). In some implementations, the random data may be related to another cryptographic operation for an unrelated block of data.

In some embodiments, plaintext may be obfuscated, e.g., through whitening using an LFSR. Blocks of plaintext may be obfuscated before encryption using chained encryption blocks. In some implementations, a block of obfuscated plaintext may be further obfuscated with a block of ciphertext output from the encryption of a preceding block of plaintext. In some implementations, blocks of ciphertext may be further obfuscated with blocks of obfuscated plaintext.

In some embodiments, blocks of ciphertext may be obfuscated with blocks of obfuscated plaintext before decryption using chained decryption blocks. Blocks of decrypted data may be combined with blocks of ciphertext to generate blocks of obfuscated plaintext. In some implementations, blocks of obfuscated plaintext may be processed with an LFSR to output corresponding blocks of plaintext.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
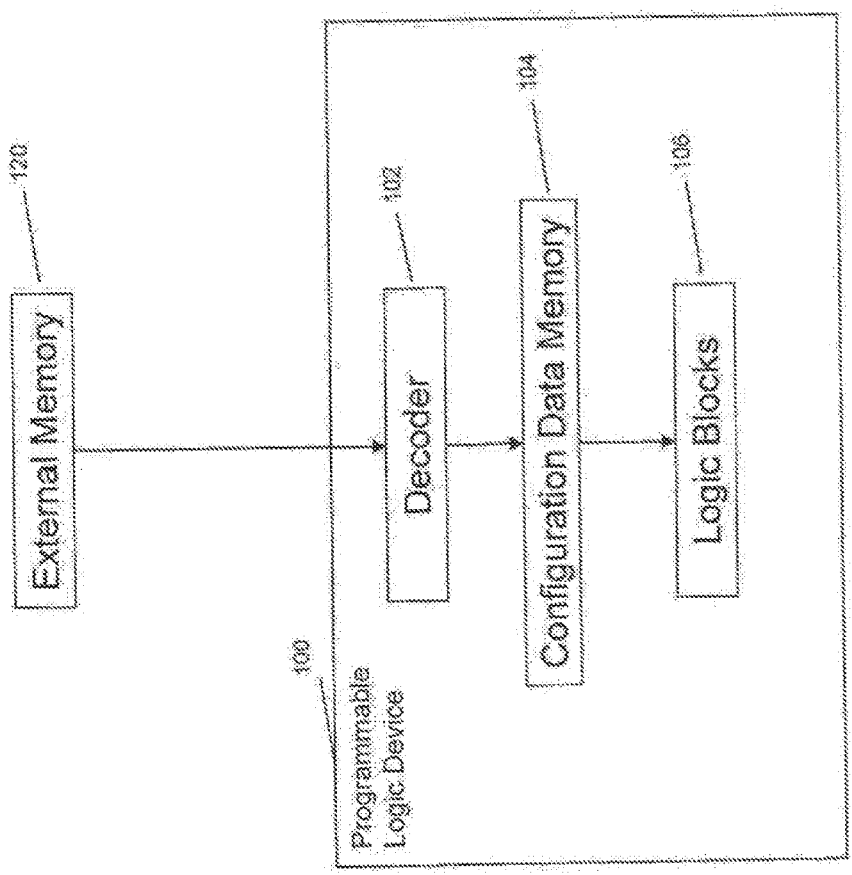
FIG. 1 is an exemplary block diagram of a programmable device in which embodiments of the present invention may be implemented.

FIG. 1 shows an exemplary block diagram of a programmable logic device 100 as an example of a programmable device in which embodiments of the present invention may be implemented. The external memory 120 contains configuration data, typically containing proprietary designs, that is used to configure the functionality of the logic device 100.

The configuration of logic device 100 may occur upon powering up the device, rebooting, or at some other reprogramming time. For example, upon powering up, the configuration data will be sent from the external memory 120 to the logic device 100. The configuration data may be encrypted in order to prevent copying when the data is in transit, e.g., using an encryption system (not shown).

The encrypted data is sent to the logic device 100 where it is decrypted by a decoder 102. The decrypted data is then stored in configuration data memory 104. The configuration data is used to configure the functionality of logic blocks 106. After configuration, the logic blocks may start operating on input data. When in operation, the logic blocks may store internal data, e.g., in data registers, RAM, or other suitable storage. This internal data may reflect specific aspects of the configuration data. Additionally, in non-programmable devices, the internal data may reflect proprietary aspects of the circuit design which may be desired to be kept secret.

In some embodiments, the configuration data (which will be referred to herein as plaintext) may be encrypted using an encryption cryptographic system that implements a cryptographic algorithm. The decoder 102 may then decrypt the encrypted data (i.e., ciphertext) using a corresponding decryption cryptographic system that implements the cryptographic algorithm.

One common cryptographic algorithm is a symmetric key block cipher algorithm adopted by the Department of Commerce, National Institute of Standards and Technology (NIST) as its Advanced Encryption Standard (AES). (See detailed specification in "Federal Information Processing Standards Publication 197" (FIPS 197), of Nov. 26, 2001.) The AES algorithm uses cryptographic keys of 128, 192 and 256 bits to encrypt and decrypt data in blocks of 128 bits. The algorithm iterates a number of nearly identical rounds depending on key length and block size. AES128 uses 10 rounds, AES192 uses 12 rounds and AES256 uses 14 rounds to complete an encryption or decryption operation.

Although the remainder of this specification will mainly discuss the AES embodiment, it should be understood that embodiments of the invention described herein are applicable to other key lengths and block sizes as well as to other cryptographic algorithms and modes of operation. As such, discussing the embodiments with respect to AES cryptographic algorithm is exemplary and not intended to limit the scope of the present invention.

Figure 2A:
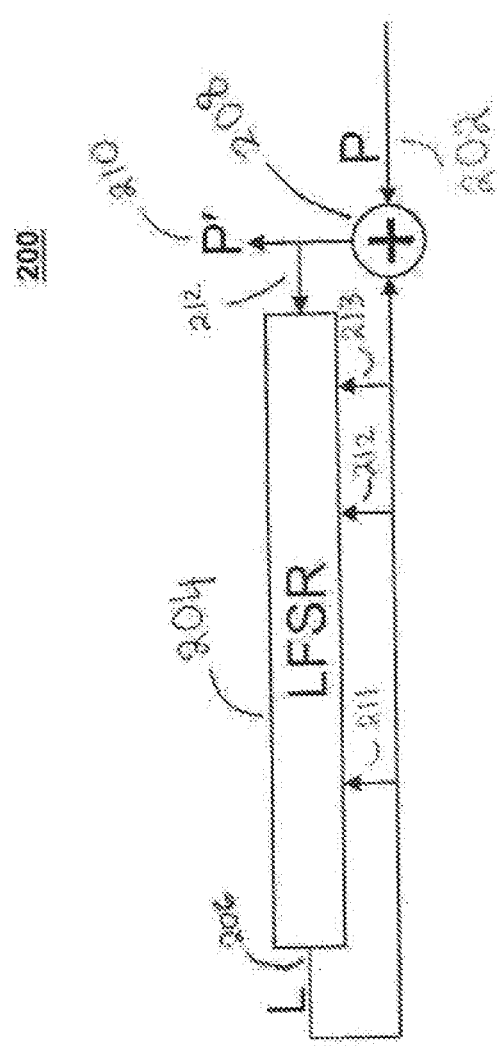
FIG. 2A is an exemplary block diagram of a whitening system for obfuscating blocks of plaintext according to an embodiment of the present invention.

In some embodiments, plaintext (e.g., configuration data received in a configuration device for configuring programmable logic device 100 of FIG. 1) may be processed prior to encryption with a cryptographic algorithm. This may increase the security of the cryptographic algorithm. For instance, blocks of plaintext may be obfuscated prior to encrypting these blocks with AES. FIG. 2A shows an exemplary block diagram of whitening system 200 that could be used to carry out plaintext obfuscation according to an embodiment of the present invention. Whitening system 200 may include a linear feedback shift register (LFSR) 204 coupled to combining circuitry 208.

In some implementations, combining circuitry 208 may be implemented as an exclusive-OR gate. In some implementations, combining circuitry 208 may include multiplicative and/or inversion elements. Although the remainder of the patent specification will refer to the exclusive-OR gate implementation of combining circuitry 208, it should be understood that the invention described herein is applicable to other combining functions as well. As such, discussing the embodiments with respect to the exclusive-OR is exemplary and not intended to limit the scope of the present invention.

Plaintext data P (e.g., configuration data) may be partitioned into N blocks of M bits each, e.g., $P_1, P_2, P_3, \ldots,$ and $P_N$. For example, according to AES, P may be partitioned into blocks of M=128 bits. Each block of plaintext $P_i$ (i=1, ..., N) may be fed into input 202 of combining circuitry 208.

Combining circuitry 208 is coupled to LFSR 204. In some embodiments, LFSR 204 may be implemented as an M-cell shift register. During each cycle of data transfer, an input bit, e.g., a bit from combining circuitry 208, may be fed into a first cell of LFSR 204, and each bit in LFSR 204 may shift down one cell. The bit in the last cell of LFSR 204 may be shifted out at output 206 as an output bit. The bits output at output 206 will be referred to as output bitstream L. These bits may be fed back to the LFSR through feedback lines 211, 212, and/or 213, such that they are combined with one or more of bits in predetermined cells of the LFSR (called taps). This feedback causes the bits output by LFSR 204 at output 206 to cycle through a set of unique values that may appear random, i.e., a set of pseudo-random values.

In some embodiments, the arrangement of taps for feedback in the LFSR (i.e., the bits in the LFSR cells that influence the output as described above) can be expressed as a feedback polynomial, where the powers of the terms represent the tapped bits. In an illustrative implementation, LFSR 204 may be implemented as a 128-bit register with a characteristic feedback polynomial $POLY=X^{128}+X^{99}+X^{62}+X^{33}+1$. According to this implementation, bits in cells 99, 62, and 33 may be combined to produce the output bit in the next stage. The output of the LFSR may be viewed as a division by the characteristic polynomial POLY.

Because the operation of an LFSR is deterministic, the initial value with which the LFSR is initialized determines the operation of the register and may be viewed as a random seed that initializes the LFSR pseudo-random generation. In the embodiment illustrated in FIG. 2A, and referring to the $i^{th}$ value contained in the LFSR as $R_i$, a first block $R_0 = E^{-1}_{K0}(0)$ may be used to initialize LFSR 204. Because a secret key $K_0$ is used to generate $R_0$, the random seed that initializes the LFSR pseudo-random generation is still unknown to the attacker.

Blocks of plaintext $P_i$ (i=1, ..., N) may be input into the initialized LFSR through combining circuitry 208. Combining circuitry 208 may combine the output of the LFSR with the block of plaintext $P_i$ to generate a block of obfuscated plaintext $P'_i$ at output 210. For example, the block of plaintext $P_i$ may be XORed with the output of the LFSR to generate the block of obfuscated plaintext $P'_i$. Such an operation is referred to as whitening the block of plaintext $P_i$.

Overall, the operation of whitening system 200 of FIG. 2A may be expressed as follows:

$$(L_1\| \ldots \|L_N)=(E^{-1}_{K0}(0)\|P_1\| \ldots \|P_N) \text{DIV POLY},$$

where POLY represents the feedback polynomial of LFSR 204, $P_1\| \ldots \|P_N$ represents a concatenation (e.g., using the concatenation symbol ||) of the blocks of plaintext $P_i$ input at 202, $E^{-1}_{K0}(0)$ represents the value used to initialize LFSR 204, and $L_1\| \ldots \|L_N$ represents a concatenation of the blocks of output bits in output bitstream L. Output bitstream L and plaintext P may be combined to generate obfuscated or whitened plaintext P' as follows:

$$(P'_1\| \ldots \|P'_N)=(P_1\| \ldots \|P_N) \text{XOR} (L_1\| \ldots \|L_N).$$

The operation of LFSR 204 may be described using the following incremental equations:

$$L_0=0, \qquad \text{(EQ. 1a)}$$

$$R_0=E^{-1}_{K0}(0), \qquad \text{(EQ. 1b)}$$

$$L_i=(R_{i-1}\|0)\text{DIV POLY}, \qquad \text{(EQ. 1c)}$$

$$R_i=(R_{i-1}\|P_i)\text{MOD POLY}, \qquad \text{(EQ. 1d)}$$

where i=1, ..., N.

The first two equations (EQS. 1a and 1b) correspond to initializing the LFSR by setting the initial value contained in the LFSR $R_0$ and the first block of output bits $L_0$. As explained above, $R_0$ may be set to a block of mask values generated from decrypting a vector of predetermine values (e.g., all zeros) using cipher key $K_0$. In this way, even if the vector of predetermined values is predictable, the value obtained by decrypting the vector of predetermined values using cipher key $K_0$ is still unknown to the attacker. In some implementations, $L_0$ may be set to a vector of all zeros. It should be understood that these initialization values of $R_0$ and $L_0$ are merely exemplary and that $R_0$ and $L_0$ may be initialized to any other suitable value.

The latter two equations (EQS. 1c and 1d) describe the operation of the LFSR, and in particular, how the output bitstream $L_i$ and the LFSR state $R_i$ are updated. As explained above, the operation of the LFSR may be viewed as performing division of the value contained in the LFSR $R_{i-1}$ by the feedback polynomial POLY to generate output bitstream block $L_i$. As blocks of plaintext $P_i$ are input into the LFSR 204, the value contained in the LFSR $R_i$ may be expressed as the result of concatenating the previous LFSR block (or state) $R_{i-1}$ with a current block of plaintext $P_i$ and taking the modulo polynomial POLY to generate the current LFSR state $R_i$.

Figure 2B:
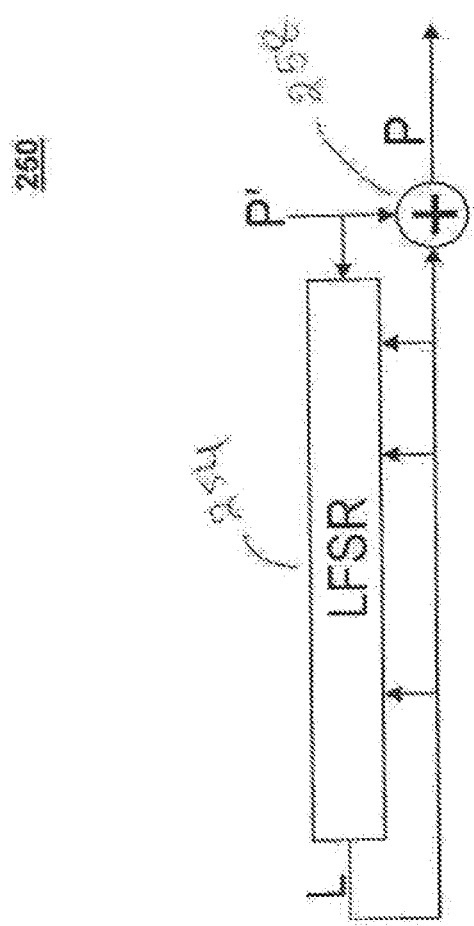
FIG. 2B is an exemplary block diagram of an unwhitening system for unwhitening blocks of obfuscated plaintext according to an embodiment of the present invention.

FIG. 2B is an exemplary block diagram of an unwhitening system for unwhitening blocks of obfuscated plaintext according to an embodiment of the present invention. This system may be viewed as the counterpart of FIG. 2A and comprises LFSR 254 and combining circuitry 258. Blocks of obfuscated plaintext P' are input into the LFSR 254 and combining circuitry 258. Combining circuitry 258 combines obfuscated plaintext P' and the output bistream L to generate unwhitened plaintext P.

Blocks of obfuscated plaintext $P'_1, \ldots, P'_N$ may be input into LFSR 254 and combining circuitry 258. LFSR 254 may operate similarly to LFSR 204 of FIG. 2A above. The operation of unwhitening system 250 of FIG. 2B may be expressed as follows:

$$R_0=E^{-1}_{K0}(0),$$

$$L_i=(R_{i-1}\|0)\text{DIV POLY},$$

$$R_i=(R_{i-1}\|P_i)\text{MOD POLY, and}$$

$$P_i=L_i \text{ XOR } P'_i,$$

where i=1, ..., N. The first three equations are similar to EQS. 1b, 1c, and 1d above, and describe the initialization and operation of LFSR 258. The last equation describes the operation of combining circuitry 258 to generate unwhitened plaintext P from XORing output bitream block $L_i$ and obfuscated plaintext block $P'_i$.

Whitening (or unwhitening) the plaintext, as illustrated in FIGS. 2A and 2B above, may increase security against DPA by masking the first round of AES encryption (or the last round of the AES block decryption). Given that these rounds are particularly vulnerable to DPA attacks, and given that they operate on the key without modification of plaintext or ciphertext, the plaintext obfuscation discussed above may increase the security of the device against DPA attacks.

Figure 3A:
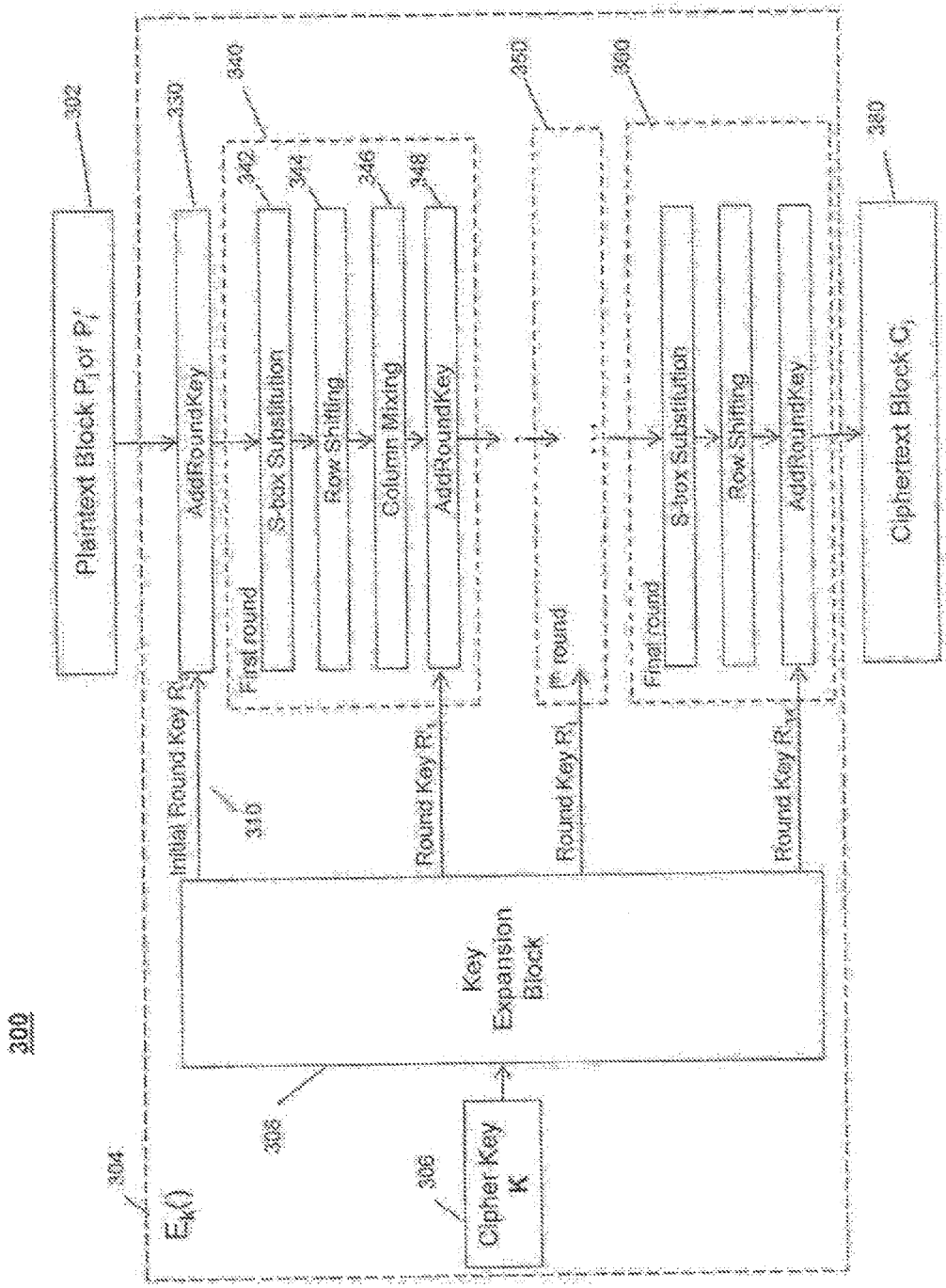
FIG. 3A is an exemplary block diagram for an encryption system implementing AES with continuously evolving cryptographic keys according to some embodiments.

In some embodiments, blocks of plaintext, $P_i$, or blocks of obfuscated plaintext, $P'_i$, e.g., as output by whitening system 200 of FIG. 2A, may be input to an AES encryption system. FIG. 3A is an exemplary block diagram of an encryption system 300 for encrypting plaintext (obfuscated or not) using AES with a cipher key K. This cipher key K 306 may be uploaded into the engine system and/or stored in the engine system. Encryption system 300 may include a block 302 for receiving and/or storing plaintext, a block 380 for receiving and/or storing corresponding ciphertext, and an encryption block 304 that implements encryption function $E_K()$. Encryption block 304 may receive a block of plaintext ($P_i$ or $P'_i$) and generate a corresponding block of ciphertext based on cipher key K.

A block of plaintext $P_i$ or obfuscated plaintext $P'_i$ may be input into block 302. An initial key mix operation 330 may be performed in which the plaintext block is XORed with an initial round key 310. In normal AES, this initial key is generated from a first portion of the cipher key K. This initial key mix operation provides the starting data for the first round 340. In some embodiments, instead of generating the first round key $R^i_1$ from the cipher key K (e.g., by expanding the initial key 310 $R^i_0$ that is based on the first portion of the cipher key K), a round key for one block may be used to generate a round key of another block. This will be described in more detail below.

During the first round 340, the following operations occur: (a) a data block is transformed using S-box substitution 342, row shifting 344, and column mixing 346, (b) round key 312 is generated in key expansion block 308, and (c) the transformed data block and round key 312 are added together using an XOR operation in the AddRoundKey 348 operation to provide the starting data block for the next round. Similar operations are repeated for each $i^{th}$ round 350 of AES (i.e., for each of the 14 rounds for AES256) with the exception that the column mixing operation is omitted in the final round 360. The details of the S-box substitution, row shifting, and column mixing operations for the rounds are described in the above-mentioned NIST document.

A sequence of round keys for each encryption round (or key schedule) is generated from the initial cipher key K using a key expansion routine, e.g., implemented by block 308. In AES, the length of the round keys is the same as the block size (128 bits=4 words) regardless of the length (128, 192, or 256 bits) of the original cipher key. The words of the cipher key are used as is for generating the first round keys, then each successive round key word is a function of one or more of the preceding round key words. This generating of each successive round key word based on at least one of the preceding round key words will be referred to herein as the evolution of round keys. In AES256, encryption and decryption for a particular block evolve the round keys in reverse order. If the fourteen decryption round keys for block 1 are $R^1_1$ through $R^1_{14}$, then the encryption round keys for block 1 will be $R^1_{14}$ through $R^1_1$.

According to some embodiments, the cipher key used for encrypting subsequent blocks of plaintext or obfuscated plaintext is different with every block. This is different from normal AES where the same key schedule based on the same cipher key K is used for every block and the initial round key (i.e., key 310) used in the first round of AES for every block is filled from the first words of the cipher key K. In some embodiments, encrypting a first block of plaintext $P_1$ (or $P'_1$) may use the same sequence of 14 round keys (or key schedule) as normal AES based on the original cipher key K. However, encrypting a second block of plaintext $P_2$ (or $P'_2$) may use a different key schedule. For example, a sequence of round keys for encrypting $P_2$ may be based on expanding an initial round key that is different from the one used for $P_1$.

In some embodiments, every block may be encrypted using a different key such that the keys for encrypting subsequent blocks of plaintext are related. In some implementations, the round keys for encrypting different blocks of plaintext may continue to evolve between blocks. For example, the key used for encrypting a block of plaintext or obfuscated plaintext may be derived based on a function of the previous plaintext, the previous ciphertext, the previous key used to encrypt the previous plaintext or decrypt the previous ciphertext, and/or the previous LFSR value used to whiten the previous plaintext or unwhiten the previous ciphertext.

Figure 3B:
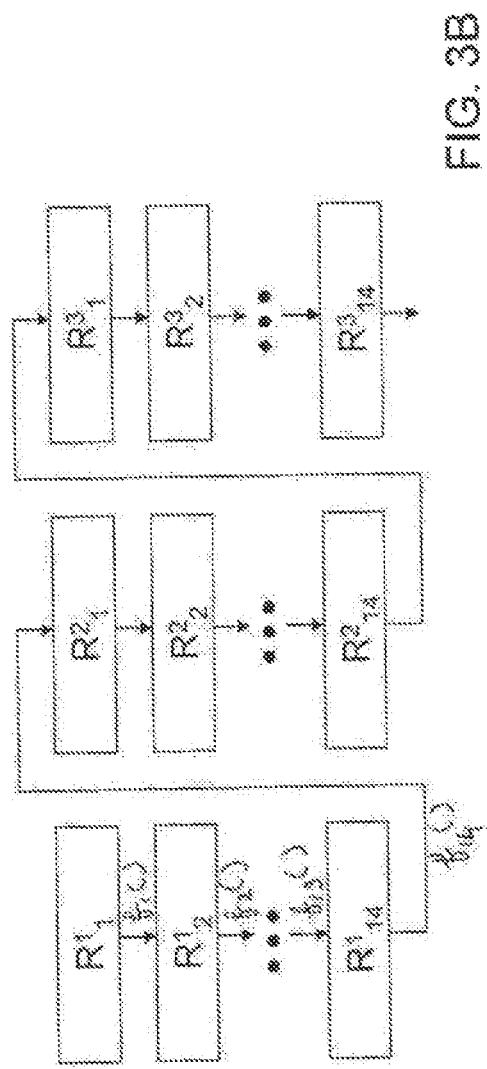
FIG. 3B is an exemplary block diagram representing the continuous evolution of cryptographic keys in a decryption system according to some embodiments.

FIG. 3B is an exemplary block diagram representing the continuous evolution of cryptographic keys in a decryption system according to some embodiments. In the example illustrated in FIG. 3B, each row may correspond to one cryptographic round and each column may correspond to one block of ciphertext. In the particular example of FIG. 3B, 14 decryption rounds and three blocks are illustrated. Each box depicts a decryption round key $R^n_l$ that may be used to decrypt block n during round l. The decryption keys of each column form a sequence of keys associated with one block of ciphertext. As explained above in connection with key expansion block 308 of FIG. 3A, a decryption round key $R^n_{l+1}$ may be derived from a decryption round key of a previous round, e.g., $R^n_l$. The relationship between the decryption round keys associated with one block may be expressed using a function $f_l()$ where l refers to the decryption round. This function $f_l()$ may describe the intra-block round key evolution used from decryption round key $R^n_l$ to decryption round key $R^n_{l+1}$. For AES128, the round key for block n and round l+1 can be derived as a function f( ) of the previous round key (i.e., $R^n_{l+1}=f(R^n_l)$ because $f_l()$ is the same, regardless of round l). For AES256, the even and odd rounds have different functions because the even and odd round keys are a function of the upper and lower 128 bits of the cipher key K. Other types of block ciphers may have different functions for each round.

According to some embodiments of the present disclosure, the decryption round key for a block n may depend on the value of a decryption round key for a previous block n−1. For example, the first round decryption key for block n may be derived from the last round decryption key used for block n−1. An intra-block function $f_I()$ may be defined to extend the inter-block function $f_l()$ described above and describe the evolution of decryption round keys between blocks, i.e., such that $R^{n+1}_l = f_I(R^n_l)$. For example, and as shown by the arrow from the first to the second column labeled $f_{14}()$, the decryption round key $R^2_1$ may be obtained from the decryption round key of the previous block, $R^1_{14}$, by applying inter-block function $f_{14}()$ (i.e., $R^2_1 = f_{14}(R^1_{14})$). This means that the key evolution of decryption round keys may continue between blocks. In standard AES256, $f_{14}()$ is not strictly defined (as the key is evolved, i.e., expanded, only 13 times to get 14 round keys, and the key of the first round key for the second block is regenerated from cipher key K, i.e., similarly to the first round key for the first block). In some embodiments that employ intra-block key evolution with an AES engine, $f_{14}()$ may be defined to be equal to the decryption key evolution function of the last even round, i.e., $f_{12}()$.

Figure 3C:
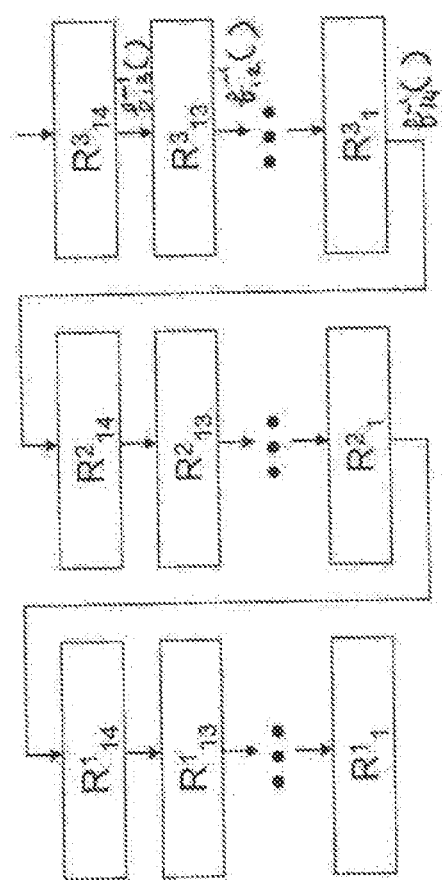
FIG. 3C is an exemplary block diagram representing the continuous evolution of cryptographic keys in an encryption system according to some embodiments.

The relationship between the decryption round keys illustrated in FIG. 3B may also define the relationship between encryption round keys $R''_{14}, \ldots, R''_1$ used for encryption. FIG. 3C is an exemplary block diagram representing the continuous evolution of cryptographic keys in an encryption system with 14 encryption rounds and three blocks. Letting $f^{-1}_i()$ correspond to the inverse of the decryption key evolution function $f_i()$ described above (both within and between blocks, i.e., inter and intra-block), the evolution of encryption round keys within each block n may be defined as $R''^n_i = f^{-1}_i(R''^n_{i+1})$. The evolution of encryption round keys between blocks n+1 and n may be defined by $R''^n_{14} = f^{-1}_1(R''^{n+1}_1)$. This evolution of encryption round keys may be viewed as the inverse of the evolution of the decryption keys of FIG. 3B.

In some embodiments, it may not be practical to evolve the encryption keys from the last block to the first block in order to starting encrypting the first block. For example, it may not be practical to start from $R^3_{14}$ to compute $R^1_1$ by sequentially applying $f^{-1}_i()$, per the order illustrated in FIG. 3. Instead of computing the encryption round keys backwards from the last block to the first block, the 14 encryption round keys $R''_{14}, \ldots, R''_1$ may be obtained by first expanding the 14 decryption round keys $R''_1, \ldots, R''_{14}$. In other words, each sequence of encryption round keys associated with block n (i.e., $R''_{14}, \ldots, R''_1$) may be computed by generating the corresponding sequence of decryption round keys (i.e., $R''_1, \ldots, R''_{14}$, as described in FIG. 3B above), and then inverting the order of the generated sequence of decryption round keys.

As discussed above, key schedule routines are specifically vulnerable to DPA attacks. According to one approach, an attacker may generate two large sets of ciphertext blocks and monitor the power consumption of a device while the device decrypts both sets of ciphertexts. Statistical analysis of the difference in power consumption between both sets may help derive information about the cipher key. The techniques described above of letting the round keys continue to evolve between block encryptions may increase the security of the device against these types of attacks because the keys used to decrypt the ciphertexts may vary with each block.

In some embodiments, the intra-block key evolution approach described in FIGS. 3A-3C above may be applied to cipher block modes of operation e.g. Counter Mode (CTR) or Cipher-Block-Chaining mode (CBC). In some embodiments, the evolving key approach may be combined with any other DPA resistant methods and systems such as the ones described herein.

Figure 4:
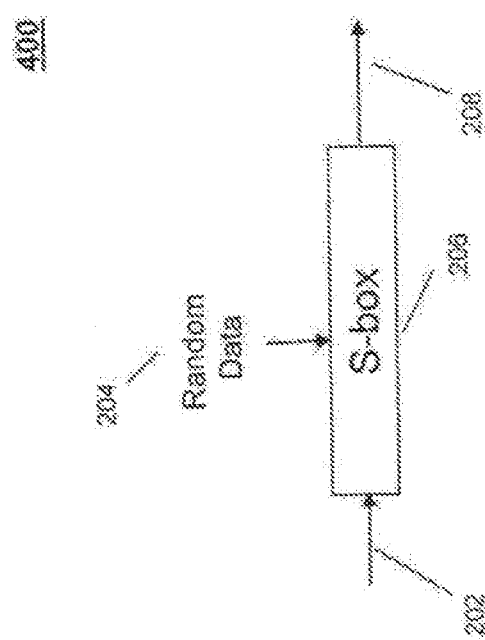
FIG. 4 is an exemplary block diagram of a system for obfuscating a cryptographic substitution box according to some embodiments.

In some embodiments, the security of the device against DPA may further be enhanced by obfuscating the substitution blocks used in a cryptographic algorithm, e.g., the S-box used in the S-box substitution operation 342 of FIG. 3A. FIG. 4 is an exemplary block diagram of system 400 for obfuscating a cryptographic substitution box according to an embodiment of the present invention. System 400 includes S-box 206, which may be implemented in hardware or software on an encryption device, e.g., on a PLD or an encryption system in configuration device. An S-box is a typical component of symmetric key cryptographic algorithms that is used to obscure the relationship between the key and the data to be encrypted or decrypted. The S-box may be implemented as a table lookup that is indexed by a combination of key bits and plaintext. For example, each byte of input text 202 may be replaced with another byte 208 according to the look up table and using the cipher key K.

S-boxes may be vulnerable to DPA attacks. An attacker may control the plaintext values and make guesses at the key bits. Based on these guesses, computations are performed on the monitored power consumption to form a set of DPA data. The DPA data is analyzed to determine with of the key bit guesses was likely correct. These types of attacks may be mitigated by obfuscating S-boxes used, for example, during AES.

In some embodiments, S-box 206 may be obfuscated by interleaving input data 202 with random data 204. This random data may not be part of the plaintext or ciphertext. In some implementations, random data 204 may be true random, e.g., generated by a true random number generator (TRNG) implemented in an FPGA. In some implementations, random data 204 may be pseudo-random, e.g., generated with an LFSR similar to LFSR 204 from FIG. 2. In some implementations, random data 204 may be generated from a separate cryptographic method operating on an unrelated block of data.

In addition to or instead of the techniques described above for obfuscating plaintext, continuously evolving cryptographic round keys, and/or obfuscating substitution tables, security of a device may be enhanced by obfuscating ciphertext as illustrated in FIGS. 5-8 below.

Figure 5A:
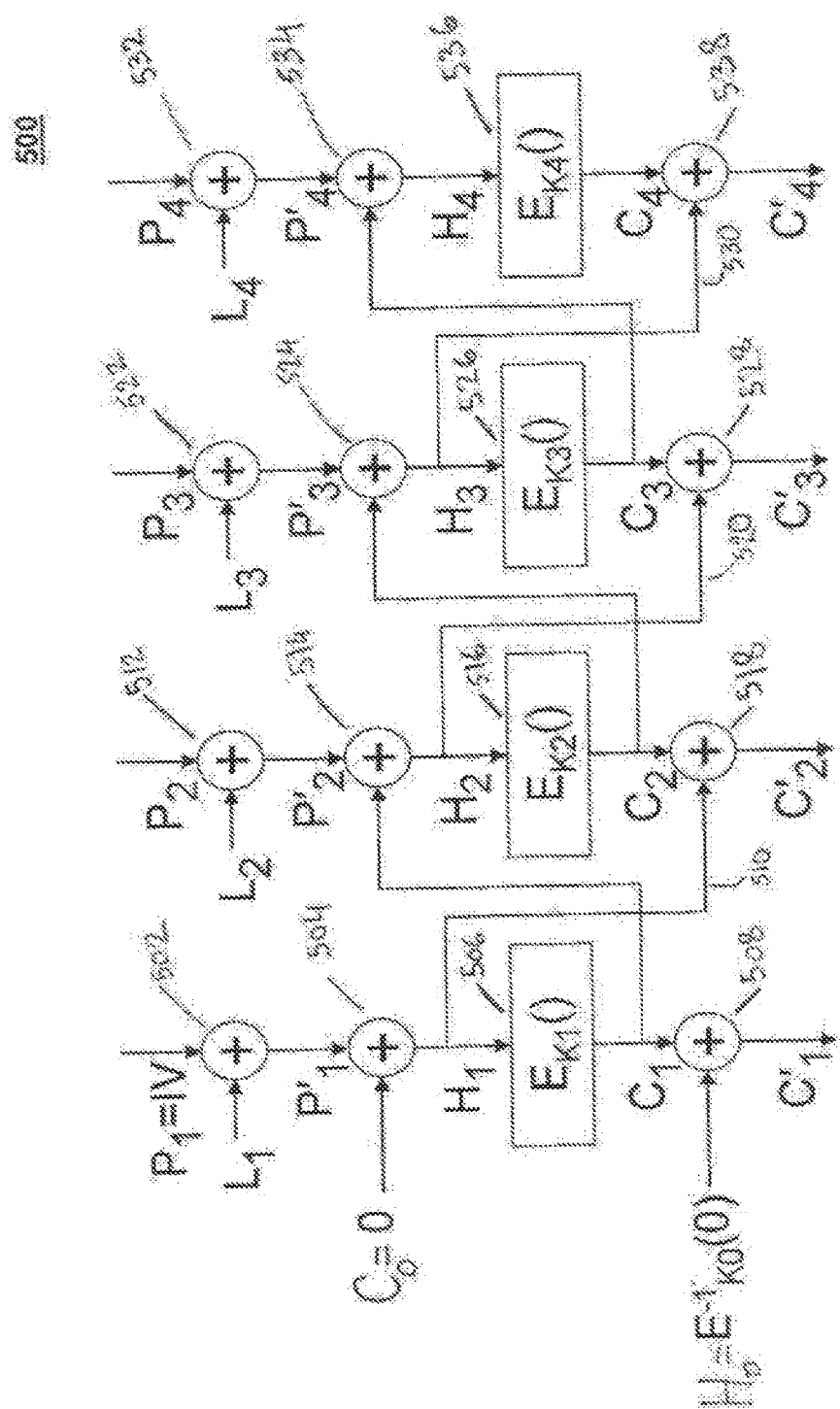
FIG. 5A is an exemplary block diagram of an encryption system for encrypting data according to some embodiments.

FIG. 5A shows an exemplary block diagram of encryption system 500 for encrypting data according to some embodiments. Encryption system 500 may include encryption blocks 506, 516, 526, and 536. These encryption blocks may be implemented as encryption block 300 of FIG. 3A, using normal AES or AES modified to use continuously evolving keys. System 500 may also include combining circuitries 502, 512, 522, 532, 504, 514, 524, 534, 508, 518, 528, and 538. Each one of these combining circuitries may be implemented similarly to combining circuitry 208 of FIG. 2A. It should be noted that the number of encryption blocks and the number of combining circuitries are exemplary and not intended to limit the scope of the present invention.

Blocks of plaintext $P_1$, $P_2$, $P_3$, and $P_4$ are whitened using whitening bistream blocks $L_1$, $L_2$, $L_3$, and $L_4$. These whitening bistream blocks may be generated using an LFSR as described in FIG. 2A above. The plaintext blocks and whitening bistream blocks are combined using combining circuitries 502, 512, 522, and 532 to output blocks of obfuscated plaintext $P'_1$, $P'_2$, $P'_3$, and $P'_4$. The first block of plaintext $P_1$ may be set to an initialization vector (IV). An IV is a fixed-size seed input to a cryptographic mode that is typically random or pseudorandom. For block ciphers, the use of an IV randomizes the encryption and hence produces distinct ciphertexts even if the same plaintext ($P_2$, $P_3$, ...) is encrypted multiple times.

The blocks of obfuscated plaintext $P'_1$, $P'_2$, $P'_3$, and $P'_4$ are further obfuscated by combining them, respectively, with blocks of ciphertext $C_0$, $C_1$, $C_2$, and $C_3$ using combining circuitries 504, 514, 524, and 534. In some embodiments, ciphertext block $C_0$ may be initialized to zero, or to any other suitable value. Ciphertext blocks $C_1$, $C_2$, and $C_3$ are output from encryption blocks 506, 516, and 526, respectively, as will be discussed below. The blocks resulting from combining the blocks of obfuscated plaintext and the blocks of ciphertext are referred to as blocks of further obfuscated plaintext $H_1$, $H_2$, $H_3$, and $H_4$.

Blocks $H_1$, $H_2$, $H_3$, and $H_4$ are encrypted using encryption blocks 506, 516, 526, and 536 to generate ciphertext blocks $C_1$, $C_2$, $C_3$, and $C_4$. In some embodiments, encryption blocks 506, 516, 526, and 536 may use different cipher keys $K_1$, $K_2$, $K_3$, and $K_4$. For example, the keys $K_1$, $K_2$, $K_3$, and $K_4$ may be obtained using the evolving key approach described in FIGS. 3A-C above. In some embodiments, encryption blocks 506, 516, 526, and 536 may use the same cipher key, e.g., as defined in normal AES ($K_1=K_2=K_3=K_4$).

The first obfuscated block $H_1$ is fed into the first encryption block 506 to generate a block of ciphertext $C_1=E_{K1}(H_1)$, i.e., the result of encrypting $H_1$ with cipher key $K_1$. Combining circuitry 508 combines the output of the first encryption block 506 with a block of mask values $H_0=E^{-1}{}_{K0}(0)$ to generate a first block of obfuscated ciphertext $C'_1$. This block of mask values may be generated by decrypting a vector of all zeros using cipher key $K_0$. This first block of obfuscated ciphertext $C'_1$ may thus be expressed as $C_1$ XOR $H_0$.

The block of ciphertext $C_1$ is combined with the second block of obfuscated plaintext $P'_2$ using combining circuitry 514. The output of combining circuitry 514, $H_2$, is fed into the second encryption block 516. Second encryption block 516 encrypts $H_2$ to generate a second block of ciphertext $C_2=E_{K2}(H_2)$. Combining circuitry 518 combines the first block of further obfuscated plaintext $H_1$ with the second block of ciphertext $C_2$ to generate a second block of obfuscated ciphertext $C'_2$. The operation of combining circuitry 518 may be viewed as whitening the block of ciphertext $C_2$ with the prior block of further obfuscated plaintext $H_1$ to output the block of obfuscated ciphertext $C'_2$.

Similar operations may be repeated to generate a third block and fourth block of ciphertext $C_3$ and $C_4$ and a third block and fourth block of obfuscated ciphertext $C'_3$ and $C'_4$.

In general, the blocks of obfuscated plaintext, further obfuscated plaintext, ciphertext, and obfuscated ciphertext that are output by encryption system 500 may be expressed using the following equations:

$$L_0=0, \qquad\qquad (EQ.\ 1a)$$

$$R_0=E^{-1}{}_{K0}(0), \qquad\qquad (EQ.\ 1b)$$

$$L_i=(R_{i-1}\|0)\text{DIV POLY}, \qquad\qquad (EQ.\ 1c)$$

$$R_i=(R_{i-1}\|P_i)\text{MOD POLY}, \qquad\qquad (EQ.\ 1d)$$

$$H_0=E^{-1}{}_{K0}(0), \qquad\qquad (EQ.\ 2a)$$

$$C_0=0, \qquad\qquad (EQ.\ 2b)$$

$$P_1=IV, \qquad\qquad (EQ.\ 2c)$$

$$P'_i=L_i\ \text{XOR}\ P_i, \qquad\qquad (EQ.\ 3a)$$

$$H_i=P'_i\ \text{XOR}\ C_{i-1}, \qquad\qquad (EQ.\ 3b)$$

$$C_i=E_{Ki}(H_i), \qquad\qquad (EQ.\ 3c)$$

$$C'_i=C_i\ \text{XOR}\ H_{i-1}, \qquad\qquad (EQ.\ 3d)$$

where i=1, . . . , N. The first set of equations, EQS. 1a, 1b, 1c, and 1d, is the same as the incremental LFSR equations of FIG. 2A and corresponds to the generation of bitstream blocks $L_1$, $L_2$, $L_3$, and $L_4$. The second set of equations, EQS. 2a, 2b, and 2c, corresponds to initialization values for the inputs of combining circuitries 504, 508, and 502, respectively. The third set of equations, EQS. 3a, 3b, 3c, and 3d, represents the relation between blocks of plaintext $P_i$, blocks of obfuscated plaintext $P'_i$, blocks of further obfuscated plaintext $H_i$, blocks of ciphertext $C_i$, and blocks of obfuscated ciphertext $C'_i$, as described above. It should be noted that the initialization values are merely illustrative, and that any suitable value may be used to initialize $L_0$, $R_0$, $H_0$, $C_0$ and $P_1$.

Figure 5B:
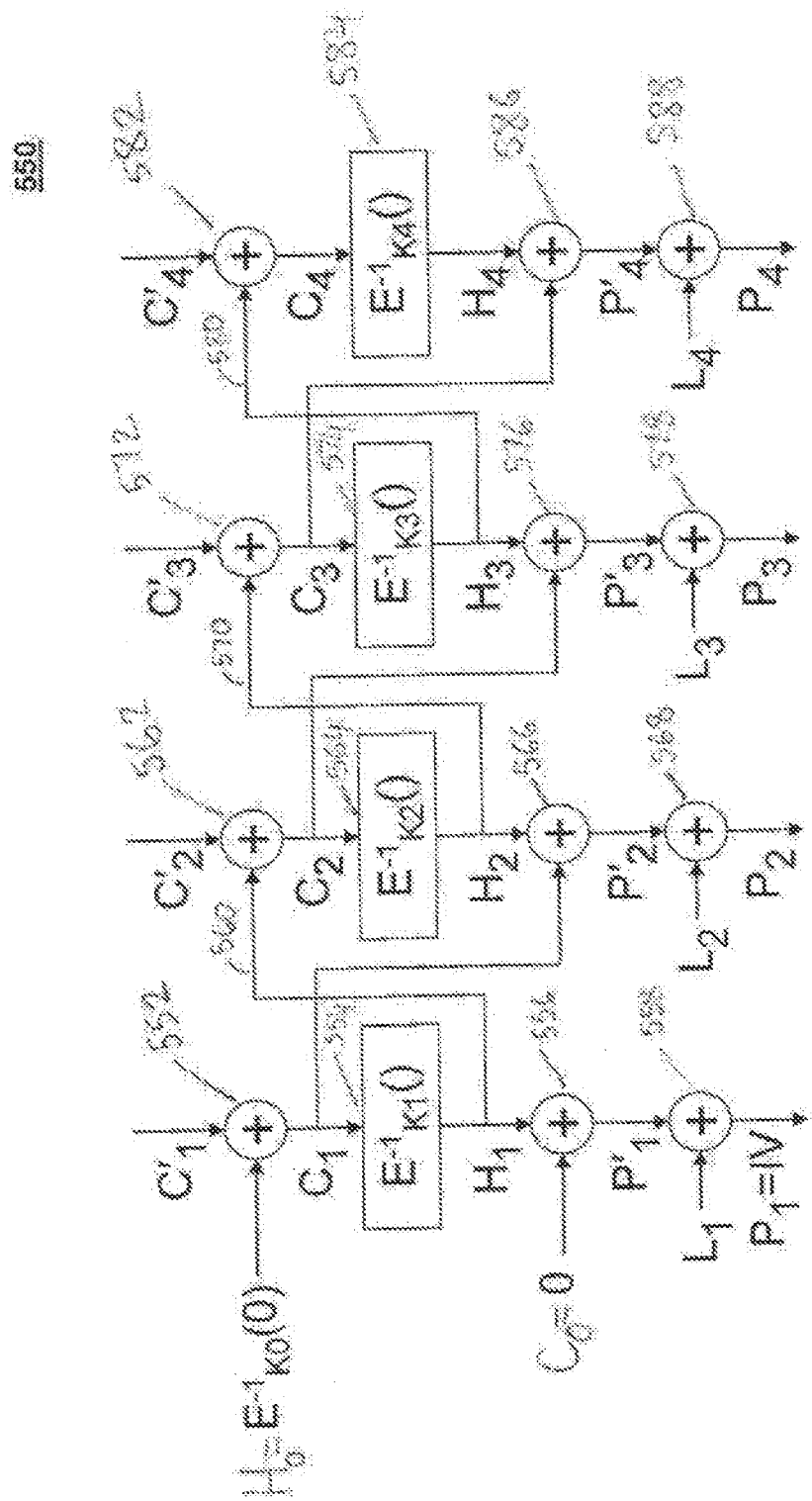
FIG. 5B is an exemplary block diagram of a decryption system for decrypting data according to some embodiments.

The blocks of obfuscated ciphertext output by encryption system 500 may be decrypted using decryption system 550 illustrated in FIG. 5B. Decryption system 550 may include decryption blocks 554, 564, 574, and 584, and combining circuitries 552, 562, 572, 582, 556, 566, 576, 586, 558, 568, 578, and 588. These combining circuitries may be implemented similarly to combining circuitry 208 of FIG. 2A. It should be noted that the number of decryption blocks and the number of combining circuitries are exemplary and not intended to limit the scope of the present invention.

Blocks of obfuscated ciphertext $C'_1$, $C'_2$, $C'_3$, and $C'_4$ are fed into decryption system 550. These blocks of obfuscated ciphertext may for example have been output from encryption system 500 of FIG. 5A. Combining circuitry 552 may combine a first block of obfuscated ciphertext $C'_1$ with a block of mask values $H_0=E^{-1}{}_{K0}(0)$. In some implementations, the block of mask values may be generated similarly to FIG. 5A, i.e., by decrypting a vector of all zeros using cipher key $K_0$. Combining circuitry 552 may output a ciphertext block $C_1=C'_1$ XOR $H_0$, which is fed into the first decryption block 554. First decryption block 554 decrypts ciphertext block $C_1$ with cipher key $K_1$ to produce a first block of further obfuscated plaintext $H_1$.

The first block of further obfuscated plaintext $H_1$ may be combined with a block of ciphertext $C_0$ using combining circuitry 556. The output of the combining circuitry 556 corresponds to obfuscated plaintext block $P'_1$. This block of obfuscated plaintext $P'_1$ may be unwhitened with bitstream block $L_1$ to generate a block of plaintext $P_1$. The bitstream block $L_1$ may be generated by an LFSR such as the one depicted in FIG. 2B.

The block of further obfuscated plaintext $H_1$ is combined with obfuscated ciphertext block $C'_2$ using combining circuitry 562 to generate a block of ciphertext $C_2$. This block of ciphertext $C_2$ is decrypted using decryption block 564 to generate $H_2$. Block $H_2$ is combined with ciphertext block $C_1$ to generate obfuscated plaintext block $P'_2$. This block of obfuscated plaintext $P'_2$ may be unwhitened similarly to $P'_1$ in order to generate plaintext block $P_2$.

Similar operations may be repeated to generate a third and fourth block of obfuscated plaintext $P'_3$ and $P'_4$, and a third and fourth block of plaintext $P_3$ and $P_4$. The operation of decryption system 550 may be summarized using the following equations:

$$R_0=E^{-1}{}_{K0}(0), \qquad\qquad (EQ.\ 4a)$$

$$L_i=(R_{i-1}\|0)\text{DIV POLY}, \qquad\qquad (EQ.\ 4b)$$

$$R_i=(R_{i-1}\|P_i)\text{MOD POLY}, \qquad\qquad (EQ.\ 4c)$$

$$H_0=E^{-1}{}_{K0}(0), \qquad\qquad (EQ.\ 5a)$$

$$C_0=0, \qquad\qquad (EQ.\ 5b)$$

$$C_i=C'_i\ \text{XOR}\ H_{i-1}, \qquad\qquad (EQ.\ 6a)$$

$$H_i=E^{-1}{}_{Ki}(C_i), \qquad\qquad (EQ.\ 6b)$$

$$P'_i=H_i\ \text{XOR}\ C_{i-1}, \qquad\qquad (EQ.\ 6c)$$

$$P_i=L_i\ \text{XOR}\ P'_i, \qquad\qquad (EQ.\ 6d)$$

where i=1, . . . , N. The first set of equations, EQS. 4a, 4b, and 4c, is the same as the incremental LFSR equations of FIG. 2B and corresponds to the generation of bitstream blocks $L_1$, $L_2$, $L_3$, and $L_4$. The second set of equations, EQS. 5a and 5b, corresponds to initialization values for the inputs of combining circuitries 552 and 556, respectively. The third set of equations, EQS. 6a, 6b, 6c, and 6d, represents the relation between blocks of obfuscated ciphertext $C'_i$, blocks of ciphertext $C_i$, blocks of further obfuscated plaintext $H_i$, blocks of obfuscated plaintext $P'_i$, and blocks of plaintext $P_i$, as described above. These equations are the reverse of the encryption equations 3a, 3b, 3c, and 3d above. It should be noted that the initialization values are merely illustrative, and that any suitable value may be used to initialize $R_0$, $H_0$, and $C_0$.

Although the encryption and decryption blocks and operations illustrated in FIGS. 5A and 5B above use cipher keys with different indices $K_1$, $K_2$, $K_3$, and $K_4$, it should be understood that these cipher keys may be the same or different. In some implementations, these keys may be set to one value K, e.g., for normal AES ($K_1 = K_2 = K_3 = K_4$). In some implementations, these keys may be different and may be generated using the evolving key approach described in FIGS. 3A-C above.

Figure 6:
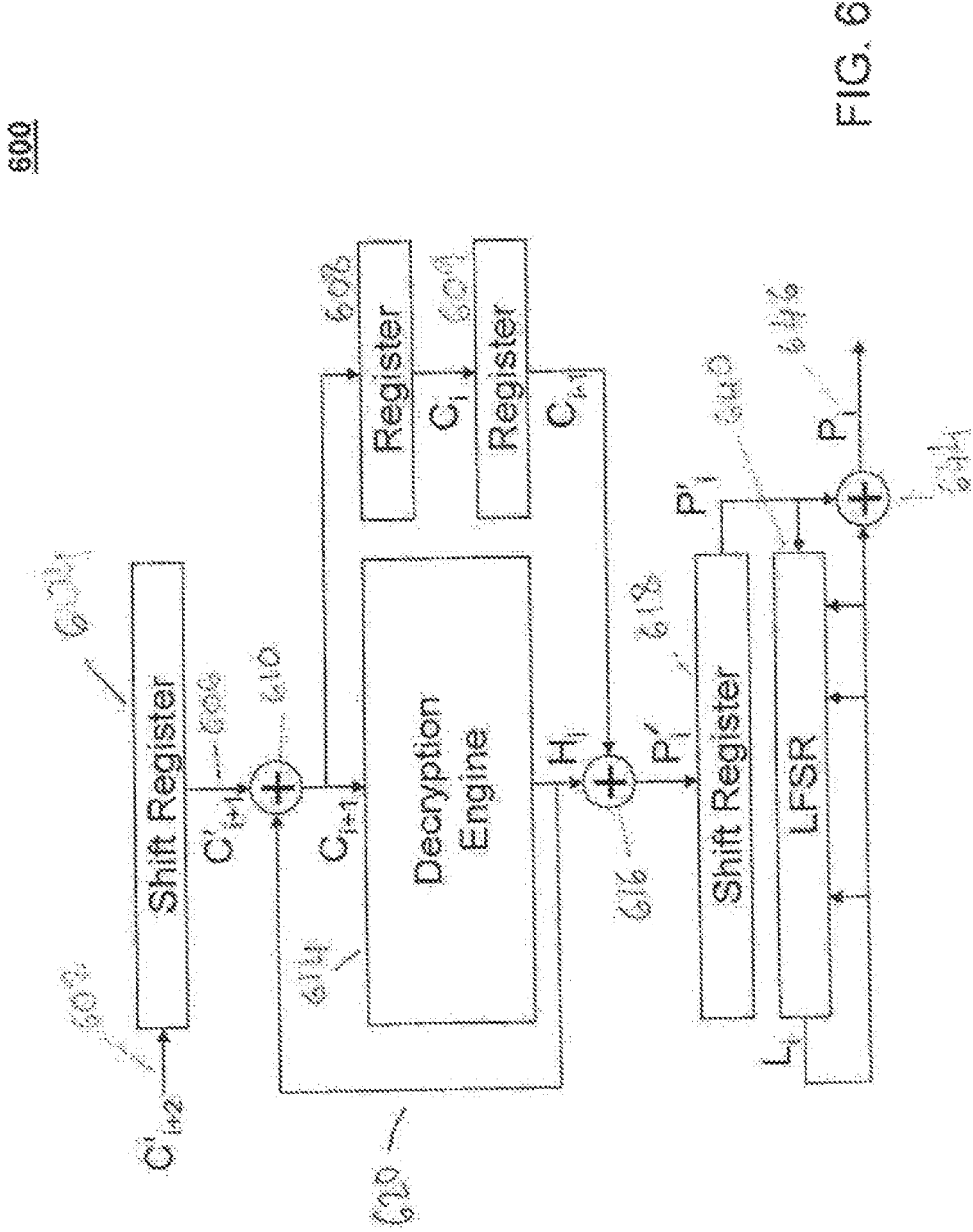
FIG. 6 is an exemplary block diagram of an illustrative decryption system for decrypting data employing a programmable logic device according to some embodiments.

An illustrative implementation of the decryption system of FIG. 5B is shown in FIG. 6. Decryption system 600 of FIG. 6 may include M-bit shift registers 604 and 618, M-bit linear feedback shift register (LFSR) 640, decryption engine 614, registers 608 and 609, and combining circuitries 610, 616, and 644. LFSR 640 may be implemented similarly to LFSR 204 of FIG. 2B. Combining circuitries 610, 616, and 644 may be implemented similarly to combining circuitry 208 of FIG. 2A.

Input shift register 604 may receive blocks of obfuscated ciphertext $C'_i$ (i=1, ..., N). These blocks may be output, for example, from encryption system 500 of FIG. 5A. In some embodiments, the blocks of obfuscated ciphertext may be received sequentially by shift register 604, such that, as input shift register 604 is receiving $C'_{i+2}$, input shift register 604 is outputting $C'_{i+1}$, register 608 is outputting $C'_i$, and register 609 is outputting $C'_{i-1}$. This arrangement is merely illustrative, and any number of registers 608 or 609 or configurations of input shift register 604 may be used as appropriate.

Combining circuitry 610 may receive a first block of obfuscated ciphertext $C'_{i+1}$ from shift register 604 and combine it with an output of decryption engine 614 to generate a corresponding block of ciphertext $C_{i+1}$. The output of combining circuitry 610 is coupled to the decryption engine 614. Decryption engine 614 may decrypt the first block of obfuscated ciphertext $C_{i+1}$ to output a first block of further obfuscated plaintext $H_i$, e.g., as specified in EQ. 6a above. The block of further obfuscated plaintext $H_i$ may be fed back to combining circuitry 610 to generate the corresponding block of ciphertext $C_{i+1}$, e.g., as specified in EQ. 6b above.

The output of combining circuitry 610 may also be coupled to serially connected registers 608 and 609, for storing the previous two generated ciphertext blocks $C_i$ and $C_{i-1}$, respectively. Combining circuitry 616 may combine the block of ciphertext output by register 609 (e.g., $C_{i-1}$) with the block of further obfuscated plaintext $H_i$ to output a block of obfuscated plaintext $P'_i$, as specified in EQ. 6c above.

The block of obfuscated plaintext $P'_i$ (i=1, ..., N) may be input into shift register 618, which is coupled to combing circuitry 644 and LFSR 640. Combining circuitry 644 and LFSR 640 are arranged similarly to system 250 of FIG. 2B above, and are configurable to unwhiten the block of obfuscated plaintext $P'_i$ to generate a block of plaintext $P_i$, e.g., as described in EQ. 6d above.

In some embodiments, the feedback line 620 from the output of decryption engine 614 to the input of combining circuitry 610 may be selectively disabled. By disabling this feedback line, decryption engine 614 may implement decryption algorithm using normal CBC mode (i.e., without whitening obfuscated ciphertext blocks with prior plaintext blocks $H_i$.)

The techniques of obfuscating plaintext and ciphertext described above may help make a device more secure against DPA. First, by masking both the input and output of the AES engine, DPA attacks may be prevented on the first and last round of a single block decryption, which are typically the most vulnerable rounds. Second, the attacker may be prevented from injecting multiple known ciphertext blocks with varying different bits, because all subsequent ciphertext blocks would be cryptographically corrupted. For example, an attacker may toggle bits of only one ciphertext block, $C'_1$, in a known fashion, and analyze the power profiles of the device while the device decrypts a large number of ciphertexts differing in this one ciphertext block $C'_i$. Using the techniques for whitening or obfuscating ciphertext blocks described above, changing one ciphertext block would propagate across all following ciphertext blocks, which would make this type of attack substantially more difficult.

In some embodiments, decryption engine 614 may decrypt each block $C_i$ using the same cipher key K. In some embodiments, decryption engine 614 may implement continuously evolving key as described in FIGS. 3A-C above. For example, decryption engine 614 may expand cipher key K from one block to the next. For instance, the first round key in decrypting ciphertext block $C_2$ may be initialized to the value of the final round key used in decrypting ciphertext block $C_1$.

In some embodiments, AES decryption engine 614 may implement the S-box obfuscation described in FIG. 4 above. In some implementations, decryption engine 614 may implement the AES algorithm using 4 S-boxes that are obfuscated as described in FIG. 4 above, e.g., using true random or pseudo-random data.

Figure 7A:
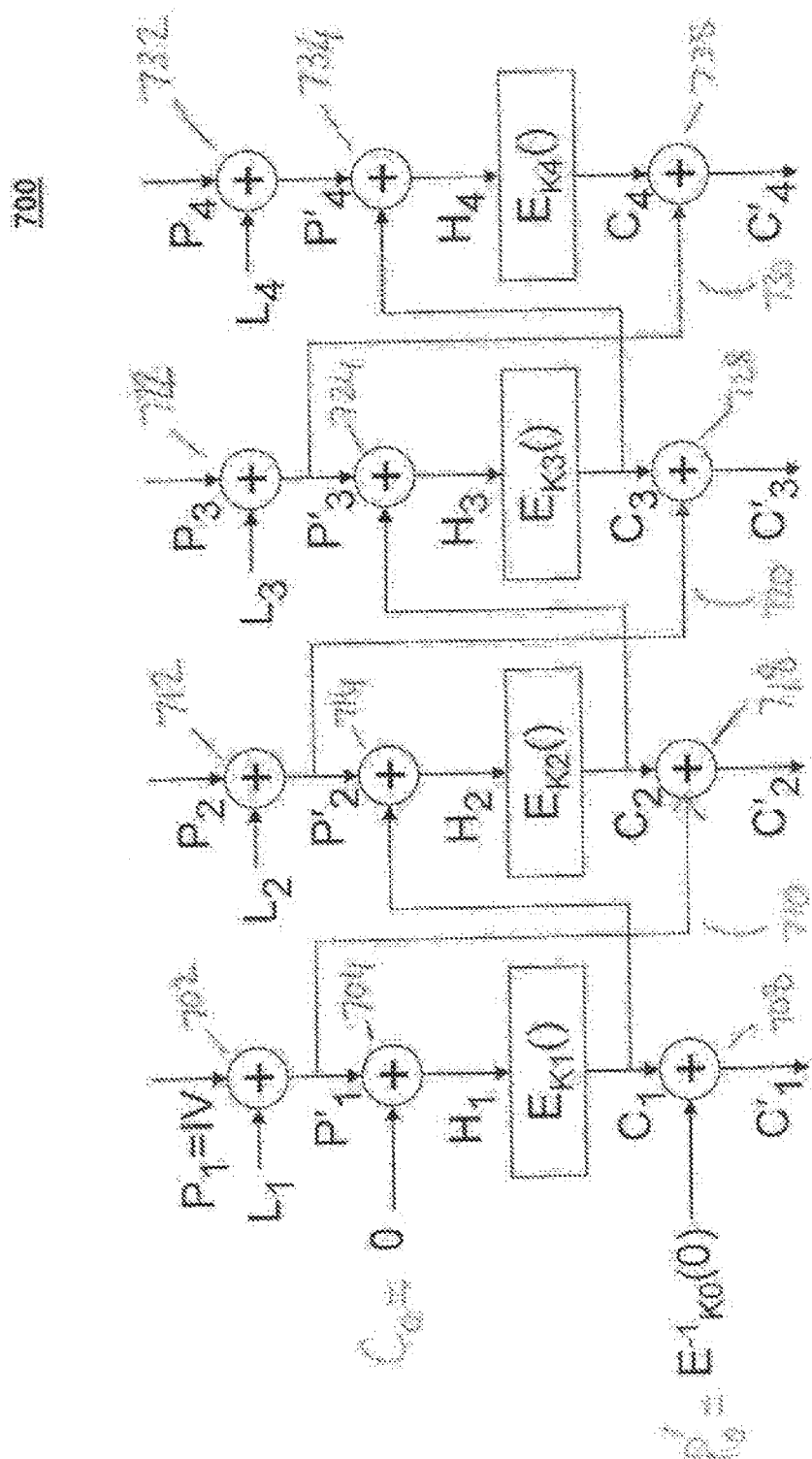
FIG. 7A is an exemplary block diagram of an encryption system for encrypting data according to some embodiments.
Figure 7B:
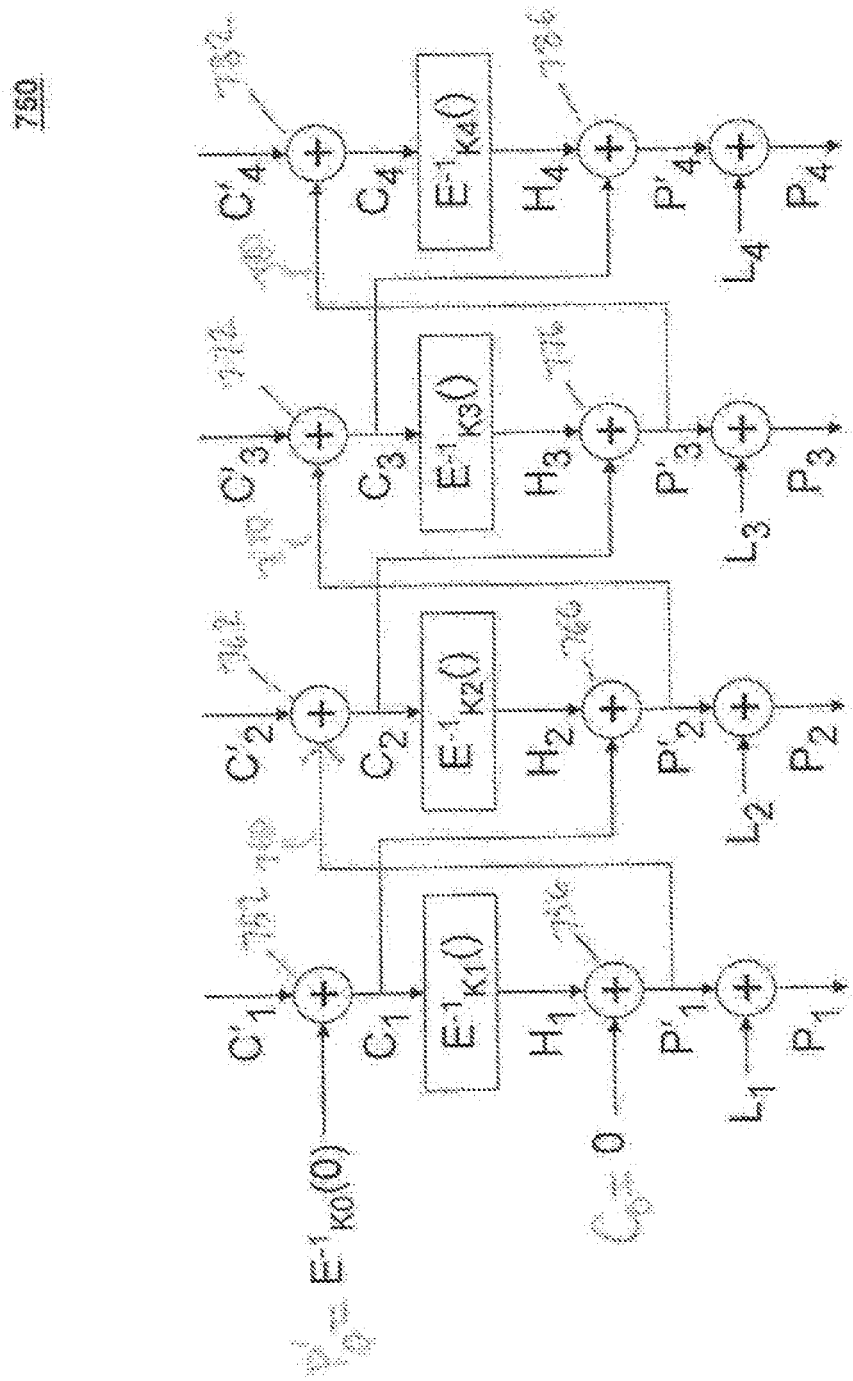
FIG. 7B is an exemplary block diagram of a decryption system for decrypting data according to some embodiments.
Figure 8:
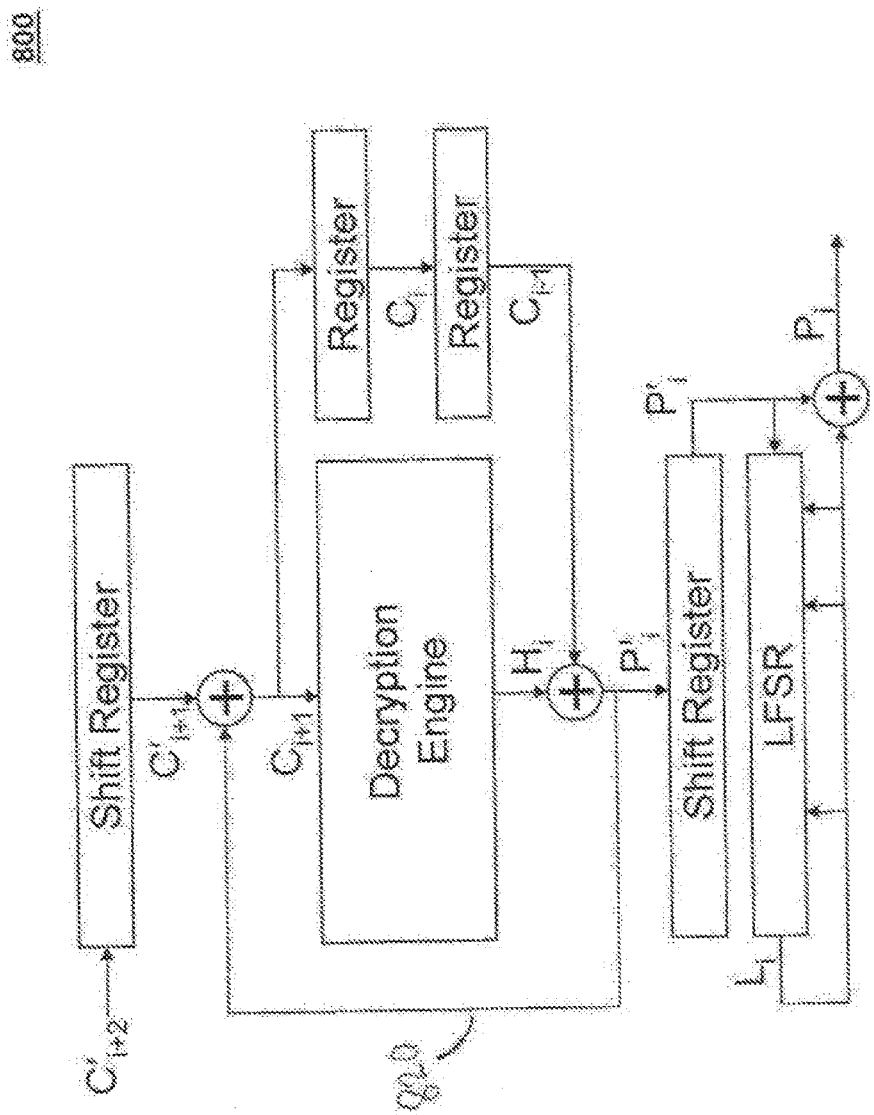
FIG. 8 is an exemplary block diagram of an illustrative decryption system for decrypting data employing a programmable logic device according to some embodiments.

FIGS. 7A, 7B, and 8 are variants of the encryption and decryption systems illustrated in FIGS. 5A, 5B, and 6, respectively.

FIG. 7A is an exemplary block diagram of an encryption system 700 for encrypting data according to some embodiments. System 700 may operate similar to system 500 of FIG. 5A, except that ciphertext blocks $C_i$ are obfuscated with blocks of obfuscated plaintext $P'_{i-1}$, instead of with blocks of further obfuscated plaintext $H_{i-1}$ as is the case in system 500. For example, combining circuitry 718 is coupled to an output of combining circuitry 702 through line 710. In contrast, in FIG. 5A, combining circuitry 518 is coupled to an output of combining circuitry 504 through line 510.

The operation of system 700 may be described using equations similar to system 500, with EQS. 2a and 3d modified as follows:

$$P'_0 = E^{-1}_{K0}(0), \quad \text{(EQ. 2a')}$$

$$C'_1 = C_i \text{ XOR } P'_{i-1}. \quad \text{(EQ. 3d')}$$

The value $P'_0$ of EQ. 2a' corresponds to the initialization value for the input of combining circuitry 708. It should be noted that this initialization value is merely illustrative, and that any suitable value may be used to initialize $P'_0$. The obfuscation of ciphertext blocks using previous obfuscated plaintext blocks is shown in EQ. 3d'.

FIG. 7B is an exemplary block diagram of a decryption system 750 for decrypting data according to some embodiments. System 750 may operate similar to system 550 of FIG. 5B, except that obfuscated ciphertext blocks $C'_i$ are unwhitened with blocks of obfuscated plaintext $P'_{i-1}$, instead of with blocks of further obfuscated plaintext $H_{i-1}$ as is the case in system 550. For example, combining circuitry 762 is coupled to an output of combining circuitry 756 through line 760. In contrast, in FIG. 5B, combining circuitry 562 is coupled to an output of decryption block 554 through line 560.

The operation of system 750 may be described using equations similar to system 550, with EQS. 5a and 6a modified as follows:

$$P'_0 = E^{-1}_{K0}(0), \qquad \text{(EQ. 5a')}$$

$$C_i = C'_i \text{ XOR } P'_{i-1}, \qquad \text{(EQ. 6a')}$$

The value $P'_0$ of EQ. 5a' corresponds to the 2a' corresponds to the initialization value for the input of combining circuitry 756. It should be noted that this initialization value is merely illustrative, and that any suitable value may be used to initialize $P'_0$. The unwhitening of obfuscated ciphertext blocks using previous obfuscated plaintext blocks is shown in EQ. 6a'.

An illustrative implementation of the decryption system of FIG. 7B is shown in FIG. 8. System 800 of FIG. 8 may operate similar to system 600 of FIG. 6, except that feedback line 820 connects an output of combining circuitry 818 to combining circuitry 810. In contrast, in FIG. 6, feedback line 620 connects the output of the decryption engine to combining circuitry 610. This modification reflects EQ. 6a' above, such that blocks of obfuscated ciphertext are unwhitened using previous blocks of obfuscated plaintext $P'_i$, rather than previous blocks of further obfuscated plaintext $H_i$.

Figure 9:
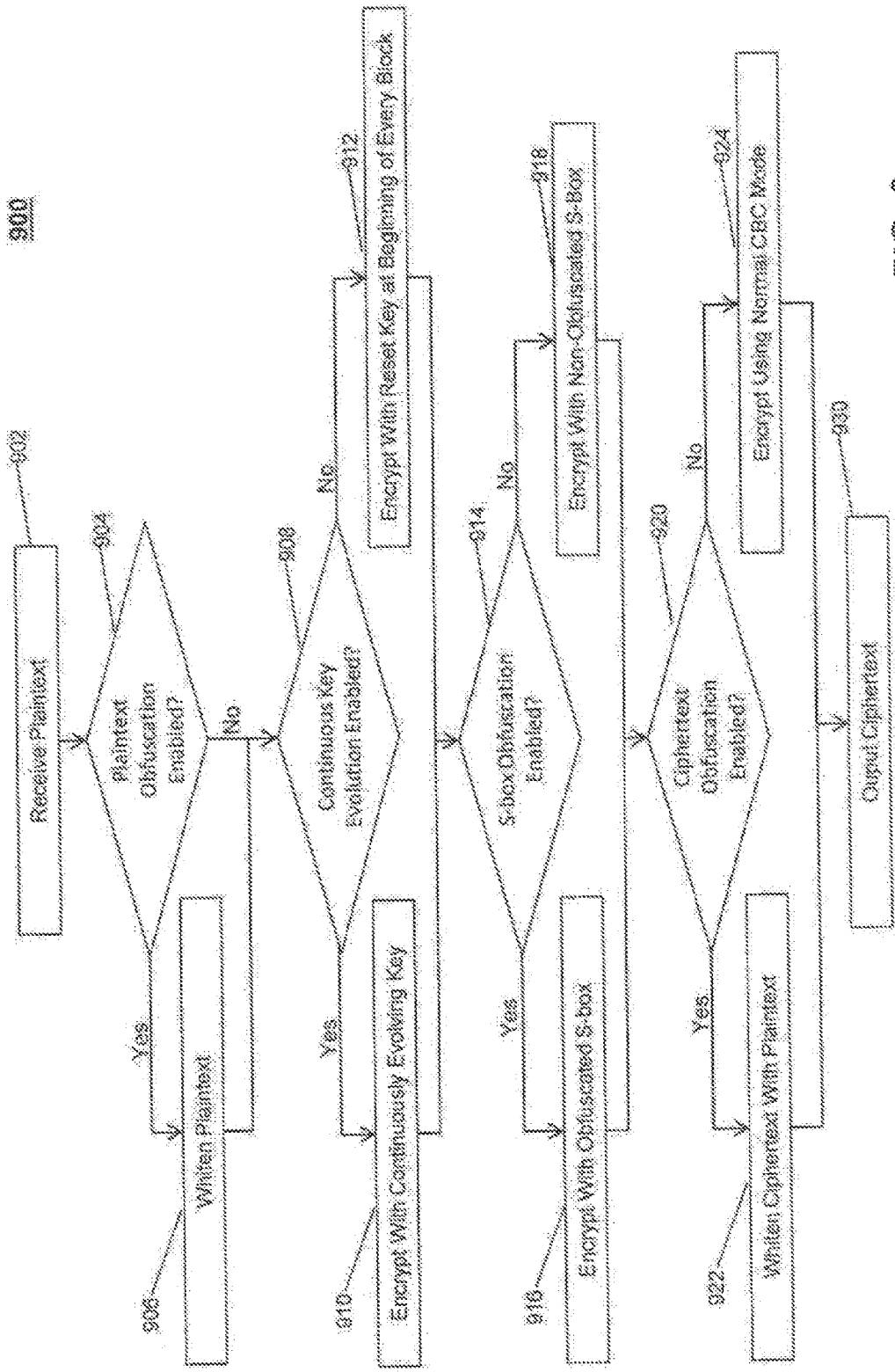
FIG. 9 shows an exemplary flowchart of a process for encrypting data according to some embodiments.

FIG. 9 shows an exemplary flowchart of process 900 for encrypting data in accordance with some embodiments. Process 900 may be executed, for example, in a system for encrypting configuration data that may be external or internal to a programmable device.

At 902, plaintext is received, for example, configuration data for configuring PLD 100 of FIG. 1 is received at the encryption system.

At 904, it is determined whether plaintext obfuscation is enabled. For example, a bit register in the configuration device may be set to enable or disable this feature. In some embodiments, plaintext obfuscation may always be enabled. If plaintext obfuscation is enabled, then plaintext is whitened at step 906, for example, as described in FIG. 2A above. Step 908 may then be performed. Alternatively, if plaintext obfuscation is disabled, then 908 may be immediately performed.

At 908, it is determined whether continuous key evolution is enabled. For example, a bit register in the configuration device may be set to enable or disable allowing the key to continue to evolve in between blocks. This may be useful for users who want to implement AES strictly according to the NIST standard, i.e., by generating round keys for each block encryption starting from the cipher key. If continuous key evolution is not enabled, then 912 may be performed. Alternatively, if at 908 key evolution mode is enabled, then 910 may be performed.

At 910, plaintext (or obfuscated plaintext from 906 if plaintext whitening is enabled) is encrypted with such that different blocks are encrypted with different keys, as described in connection with FIGS. 3A-C above. Otherwise, at 912, plaintext (or obfuscated plaintext from 906 if plaintext whitening is enabled) is encrypted using normal AES, i.e., using the original cipher key for generating the sequence of round keys (key schedule).

At 914, it is determined whether S-box obfuscation is enabled. For example, a bit register in the configuration device may be set to enable or disable this feature. Given that obfuscating cryptographic S-boxes may add computational overhead, a user may wish to disable this feature in some implementations.

If S-box obfuscation is enabled, plaintext is encrypted at 916 using obfuscated S-boxes as described in connection with FIG. 4 above, where plaintext is input into the obfuscated S-box. If S-box obfuscation is disabled, plaintext is encrypted at 918 using non-obfuscated S-boxes, such as the normal AES S-boxes.

At 920, it is determined whether ciphertext obfuscation is enabled. If it is, 922 may be performed. Otherwise, 924 may be performed.

At 922, encryption is carried out by whitening output blocks of ciphertext with blocks of plaintext (that may have been whitened or not at 906). This may be implemented using encryption system 500 of FIG. 5A or encryption 700 of FIG. 7A.

Alternatively, if ciphertext obfuscation is not enabled, then the normal cryptographic method (e.g., AES encryption) may be implemented using normal CBC mode.

Finally, at 930, ciphertext corresponding to the plaintext received at 902 is output.

Figure 10:
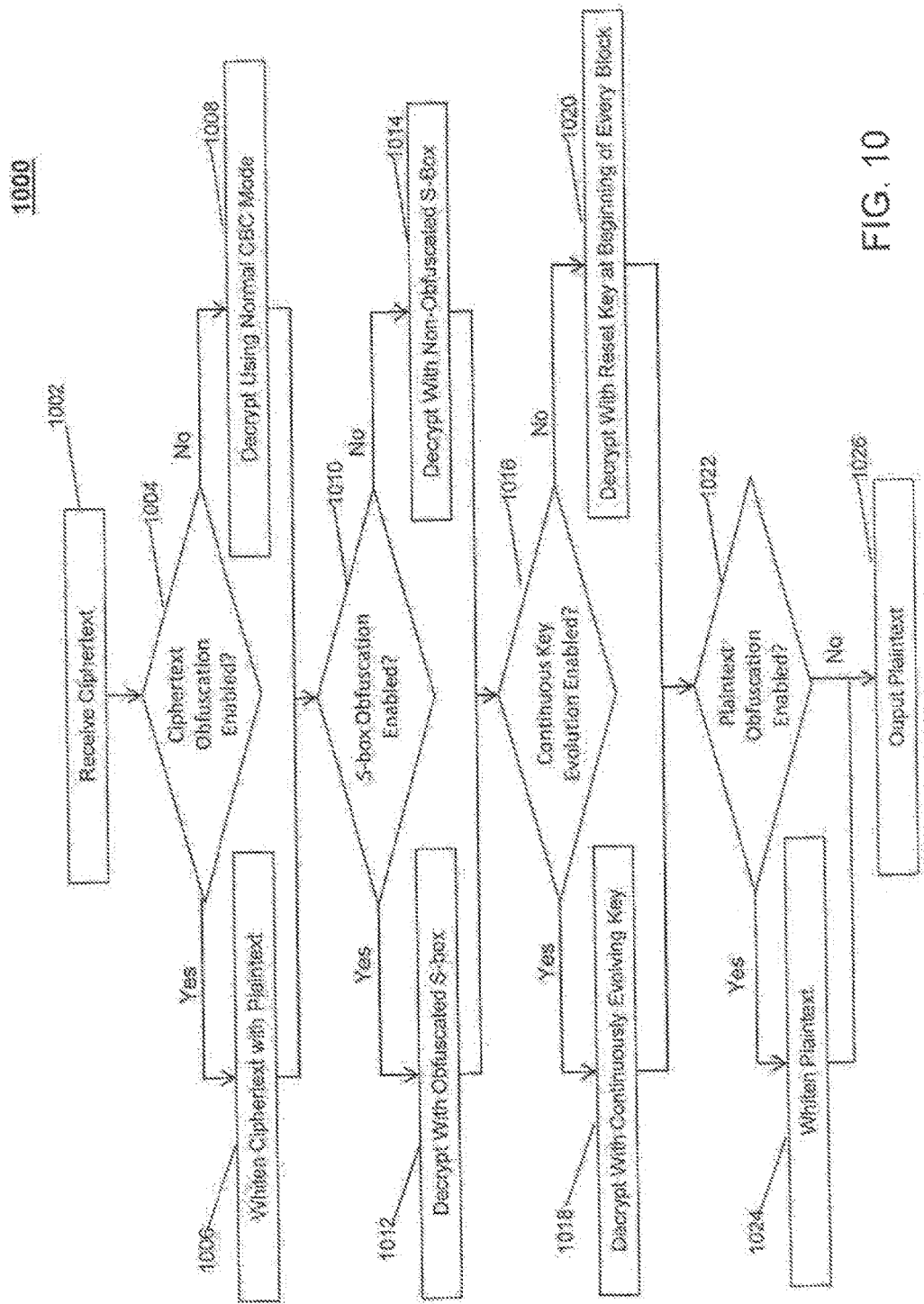
FIG. 10 shows an exemplary flowchart of a process for decrypting data according to some embodiments.

FIG. 10 shows an exemplary flowchart of process 1000 for decrypting data in accordance with some embodiments. Process 1000 may be executed, for example, in a system for decrypting configuration data in a programmable device, e.g., decoder 102 of programmable logic device 100 of FIG. 1.

At step 1002, ciphertext is received, for example, encrypted configuration data for configuring PLD 100 of FIG. 1 is received at the decryption system, or ciphertext output by encryption process 900 of FIG. 9.

At 1004, it is determined whether ciphertext obfuscation is enabled. For example, feedback lines 620 of FIG. 6 or 820 of FIG. 8 may be enabled in this case. If ciphertext obfuscation is enabled, 1006 may be performed. Otherwise, 1008 may be performed.

At 1006, decryption is carried out by whitening ciphertext with blocks of plaintext. This may be implemented using decryption systems 550 of FIG. 5B, 600 of FIG. 6, 750 of FIG. 7B, or 800 of FIG. 8. Alternatively, at 1008, if ciphertext obfuscation is not enabled, then the normal cryptographic method (e.g., AES decryption) may be implemented using normal CBC mode. For example, feedback lines 620 of FIG. 6 or 820 of FIG. 8 may be disabled in this case.

At 1010, it is determined whether S-box obfuscation is enabled. If S-box obfuscation is enabled, ciphertext is decrypted at 1012 using obfuscated S-boxes as described in connection with FIG. 4 above, where ciphertext is input into the obfuscated S-box. Otherwise, if S-box obfuscation is disabled, ciphertext is decrypted using non-obfuscated S-boxes at 1014, such as the normal AES S-boxes.

At 1016, it is determined whether continuous key evolution is enabled. If continuous key evolution is disabled, then ciphertext may be decrypted using normal AES decryption at 1020. Alternatively, if the key evolution mode is enabled, then 1018 may be performed.

At 1018, ciphertext is decrypted with a continuously evolving key, as described in connection with FIGS. 3A-B. In some implementations, different cipher keys may be used to decrypt different blocks. In some implementations, while running the AES decryption based on cipher key K, decryption of a subsequent block may use round keys that have been expanded from the key schedule of a previous block decryption.

At 1022, it is determined whether plaintext obfuscation is enabled. If plaintext obfuscation is enabled, then whitened plaintext is whitened at step 1024, for example, as described in FIG. 2B above. In particular, whitening blocks of whitened plaintext using LFSR 254 and combining circuitry 258 of FIG. 2B may generate corresponding blocks of plaintext.

Finally, at 1026, plaintext (e.g., corresponding to configuration data) that corresponds to ciphertext received at 1002 is output.

It will be understood that the above steps of processes 900 and 1000 may be executed or performed in any order or sequence not limited to the order and sequence shown and described in the figure. Also, some of the above steps of process 900 and 1000 may be executed or performed substantially simultaneously where appropriate or in parallel to reduce latency and processing times.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

The invention claimed is:

1. A method for encrypting data in an integrated circuit comprising:
   partitioning, via circuitry, plaintext into a plurality of blocks, wherein each block of the plurality of blocks is stored in memory;
   generating, via the circuitry, a first sequence of encryption round keys for encrypting a first block of the plurality of blocks from a first cipher key using a key expansion block, wherein each one of the first sequence of encryption round keys after a first one of the first sequence of encryption round keys is generated based at least in part on at least one preceding encryption round key in the first sequence;
   generating, via the circuitry, a second sequence of encryption round keys for encrypting a second block of the plurality of blocks from a second cipher key, wherein each one of the second sequence of encryption round keys after a first one of the second sequence of encryption round keys is generated based at least in part on at least one preceding encryption round key in the second sequence, wherein the second cipher key is different from the first cipher key, and wherein the first cipher key is derived as a function of:
   the second cipher key;
   the second block of the plurality of blocks;
   a block of ciphertext corresponding to the second block of the plurality of blocks;
   an output of a linear feedback shift register (LFSR) associated with the second block of the plurality of blocks; or
   any combination thereof;
   encrypting, via the circuitry, the first block of the plurality of blocks based at least in part on the first sequence of encryption round keys;
   encrypting, via the circuitry, the second block of the plurality of blocks based at least in part on the second sequence of encryption round keys; and
   transmitting, via the circuitry, the encrypted first block and the encrypted second block to a programmable logic device, wherein the programmable logic device is configured to adjust one or more circuit components of the programmable logic device based at least in part on the encrypted first block and the encrypted second block.

2. The method of claim 1, wherein said generating the first sequence of encryption round keys comprises generating, from at least one of the encryption round keys of the second sequence of encryption round keys, one of the encryption round keys of the first sequence of encryption round keys.

3. The method of claim 2, wherein said generating one of the encryption round keys of the first sequence comprises setting an encryption round key for the first block of the plurality of blocks and for a first encryption round as a function of an encryption round key for the second block of the plurality of blocks and for a last encryption round.

4. The method of claim 1, wherein said generating the first sequence and the second sequence of encryption round keys comprises:
   generating, from the first cipher key, a first sequence of decryption round keys, wherein one of the first sequence of decryption round keys is generated based at least in part on at least one preceding decryption round key in the first sequence of decryption round keys;
   generating, from a last one of the first sequence of decryption round keys, a first one of a second sequence of decryption round keys;
   generating, from a first one of the second sequence of decryption round keys, subsequent decryption round keys of the second sequence of decryption round keys using the key expansion block; and
   inverting an order of the first and second sequence of decryption round keys to generate, respectively, the first and second sequence of encryption round keys.

5. The method of claim 1,
   wherein encrypting the first block of the plurality of blocks comprises using a first plurality of encryption rounds associated with respective ones of the first sequence of encryption round keys; and
   wherein encrypting the second block of the plurality of blocks comprises using a second plurality of encryption rounds associated with respective ones of the second sequence of encryption round keys.

6. A system, comprising:
   an integrated circuit configured to encrypt data including by:
   partitioning, via circuitry, plaintext into a plurality of blocks, wherein each block of the plurality of blocks is stored in memory;
   generating, via the circuitry, a first sequence of encryption round keys for encrypting a first block of the plurality of blocks from a first cipher key using a key expansion block, wherein one of the first sequence of encryption round keys is generated based at least in part on at least one preceding encryption round key in the first sequence;
   obfuscating, via the circuitry, a substitution table by interleaving the first sequence of encryption round keys with a first set of random data;

performing, via the circuitry, a cryptographic operation to encrypt the first sequence of encryption round keys using the obfuscated substitution table;

generating, via the circuitry, a second sequence of encryption round keys for encrypting a second block of the plurality of blocks from a second cipher key, wherein one of the second sequence of encryption round keys is generated based at least in part on at least one preceding encryption round key in the second sequence, and wherein the first cipher key is derived as a function of:
the second cipher key;
the second block of the plurality of blocks;
a block of ciphertext corresponding to the second block of the plurality of blocks;
an output of a linear feedback shift register (LFSR) associated with the second block of the plurality of blocks; or
any combination thereof;

obfuscating, via the circuitry, an additional substitution table by interleaving the second sequence of encryption round keys-with a second set of random data;

performing, via the circuitry, the cryptographic operation to encrypt the second sequence of encryption round keys-using the additional obfuscated substitution table; and encrypting, via the circuitry, the first block of the plurality of blocks based at least in part on the first encrypted sequence of encryption round keys;

encrypting, via the circuitry, the second block of the plurality of blocks based at least in part on the second encrypted sequence of encryption round keys; and transmitting, via the circuitry, the encrypted first block and the encrypted second block to a programmable logic device, wherein the programmable logic device is configured to adjust one or more circuit components of the programmable logic device based at least in part on the encrypted first block and the encrypted second block.

7. The system of claim 6, wherein generating the first sequence of encryption round keys comprises generating, from at least one of the encryption round keys of the second sequence of encryption round keys, one of the encryption round keys of the first sequence of encryption round keys.

8. The system of claim 7, wherein generating one of the encryption round keys of the first sequence of encryption round keys comprises setting an encryption round key for the first block of the plurality of blocks.

9. The system of claim 6, wherein said generating the first sequence and the second sequence of encryption round keys comprises:

generating, from the first cipher key, a first sequence of decryption round keys, wherein one of the first sequence of decryption round keys is generated based at least in part on at least one preceding decryption round key in the first sequence;

generating, from a last one of the first sequence of decryption round keys, a first one of a second sequence of decryption round keys;

generating, from the first one of the second sequence of decryption round keys, subsequent decryption round keys of the second sequence of decryption round keys using the key expansion block; and inverting an order of the first and second sequence of decryption round keys to generate, respectively, the first and second sequence of encryption round keys.

10. The system of claim 6 further comprising:
encrypting the first block of the plurality of blocks using a first plurality of encryption rounds associated with respective ones of the first sequence of encryption round keys; and encrypting the second block of the plurality of blocks using a second plurality of encryption rounds associated with respective ones of the second sequence of encryption round keys.

11. The system of claim 6, wherein the first and second set of random data are generated using a True Random Number Generator (TRNG).

12. The system of claim 6, wherein the first and second set of random data are generated using a linear feedback shift register (LFSR).

13. The system of claim 6, wherein the first and second set of random data are generated using an output of an encryption operation from the second block of the plurality of blocks that is unrelated to the first block of the plurality of blocks.

14. The system of claim 6, wherein the second cipher key is different from the first cipher key.

* * * * *